United States Patent
Wu et al.

(10) Patent No.: US 12,129,863 B2
(45) Date of Patent: Oct. 29, 2024

(54) ADAPTING ASSEMBLY OF A CEILING FAN AND CEILING FAN HAVING THE SAME

(71) Applicants: Meng-Tzu Wu, New Taipei (TW); Sheng-Pu Lee, New Taipei (TW)

(72) Inventors: Meng-Tzu Wu, New Taipei (TW); Sheng-Pu Lee, New Taipei (TW)

( * ) Notice: Subject to any disclaimer, the term of this patent is extended or adjusted under 35 U.S.C. 154(b) by 67 days.

(21) Appl. No.: 18/095,916

(22) Filed: Jan. 11, 2023

(65) Prior Publication Data
US 2023/0250829 A1 Aug. 10, 2023

(30) Foreign Application Priority Data
Feb. 9, 2022 (TW) .................................. 111104646

(51) Int. Cl.
| | |
|---|---|
| *F04D 25/08* | (2006.01) |
| *F04D 25/10* | (2006.01) |
| *F04D 29/12* | (2006.01) |
| *F04D 29/60* | (2006.01) |
| *F04D 29/64* | (2006.01) |

(52) U.S. Cl.
CPC ........... *F04D 25/088* (2013.01); *F04D 25/10* (2013.01); *F04D 29/122* (2013.01); *F04D 29/601* (2013.01); *F04D 29/644* (2013.01)

(58) Field of Classification Search
CPC ........ F04D 25/06; F04D 25/08; F04D 25/088; F04D 25/10; F04D 25/105; F04D 29/602
See application file for complete search history.

(56) References Cited

U.S. PATENT DOCUMENTS

| | | | |
|---|---|---|---|
| 4,729,725 A | 3/1988 | Markwardt | |
| 5,090,654 A | 2/1992 | Ridings et al. | |
| 7,771,167 B2 * | 8/2010 | Fu | F24F 7/007 |
| | | | 416/100 |
| 8,182,226 B2 * | 5/2012 | Fu | F04D 25/105 |
| | | | 415/126 |
| 9,790,948 B2 | 10/2017 | Liu | |

(Continued)

FOREIGN PATENT DOCUMENTS

| | | | | |
|---|---|---|---|---|
| CN | 107237771 A | * | 10/2017 | ............. F04D 25/10 |
| CN | 107237772 A | * | 10/2017 | ............. F04D 25/10 |

(Continued)

OTHER PUBLICATIONS

English Machine Translation of CN-111219348-A (Year: 2020).*

*Primary Examiner* — Nathan C Zollinger
(74) *Attorney, Agent, or Firm* — Birch, Stewart, Kolasch & Birch, LLP

(57) ABSTRACT

A ceiling fan includes an adapting assembly having at least one rotary shaft and a lower sealing ring. Each rotary shaft has a seat being semi-circular and a guiding portion being semi-spherical and having a guiding surface. The lower sealing ring has at least one protrusion. The guiding portion is mounted through the lower sealing ring and the guiding surface abuts against the at least one protrusion. With the seat of the rotary shaft being semi-circular and the guiding portion being semi-spherical, when the rotary shaft is rotated, the guiding surface and the at least one protrusion coordinate with each other to rotate. The adapting assembly has reduced volume. Accordingly, the ceiling fan is lightweight, has reduced power consumption and manufacturing cost, and is easy for installation.

8 Claims, 7 Drawing Sheets

(56) References Cited

U.S. PATENT DOCUMENTS

| | | | | |
|---|---|---|---|---|
| 2008/0304969 A1* | 12/2008 | Fu | ........................ | F04D 25/105 |
| | | | | 416/148 |
| 2011/0052394 A1* | 3/2011 | Kalhofer | ................ | H02K 7/116 |
| | | | | 416/100 |
| 2011/0064577 A1* | 3/2011 | Yu | ........................ | F04D 25/105 |
| | | | | 416/100 |
| 2013/0251522 A1 | 9/2013 | Oleson | | |

FOREIGN PATENT DOCUMENTS

| | | | | |
|---|---|---|---|---|
| CN | 108843609 A | * | 11/2018 | ........... F04D 25/105 |
| CN | 111219348 A | * | 6/2020 | |
| CN | 114017377 A | | 2/2022 | |
| JP | 61106698 | | 7/1986 | |
| JP | 3145283 U | | 10/2008 | |
| JP | 202051299 A | | 4/2020 | |
| TW | M280428 U | | 11/2005 | |

* cited by examiner

ADAPTING ASSEMBLY OF A CEILING FAN AND CEILING FAN HAVING THE SAME

BACKGROUND OF THE INVENTION

1. Field of the Invention

The present invention relates to a ceiling fan and an adapting assembly, especially to a rotatable ceiling fan and an adapting assembly of the ceiling fan.

2. Description of the Prior Art(s)

With reference to FIG. 7, a rotary structure of a conventional ceiling fan, especially a rotary ceiling fan, includes a rotary shaft 90 and a sealing ring 91. The rotary shaft 90 has a panel 901, a spherical portion 902 and a through hole (not shown). The spherical portion 902 is made of metal, is solid, is formed on a side surface of the panel 901, and is an integrally formed single part. The spherical portion 902 has two elongated grooves 903 oppositely formed in an outer side surface of the spherical portion 902. The through hole is formed through the spherical portion 902 and the panel 901. The panel 901 of the rotary shaft 90 is securely connected to a driving motor (not shown). A driving rod of the driving motor is mounted through the through hole of the rotary shaft 90 and is connected to a blade assembly of the conventional ceiling fan. The sealing ring 91 has two protrusions 911 formed on an inner annular surface of the sealing ring 91 and oppositely disposed. The spherical portion 902 of the rotary shaft 90 is mounted in the sealing ring 91 with the two protrusions 911 of the sealing ring 91 protruding in the two elongated grooves 903. Thus, the driving rod of the driving motor drives the blade assembly to rotate via the rotary shaft 90.

However, the rotary shaft 90 is wholly made of metal and has a significant weight and a significant volume and it is hard to form the elongated grooves 903 on the spherical portion 902. Therefore, when the rotary shaft 90 is mounted in the conventional ceiling fan, the conventional ceiling fan becomes bulky and heavy. Consequently, load on a rotating motor that drives the driving motor and the blade assembly is increased, which causes high power consumption and reduced service life of the convention ceiling fan. Moreover, cost on transporting the conventional ceiling fan is also increased.

To overcome the shortcomings, the present invention provides an adapting assembly of a ceiling and a ceiling fan having the same to mitigate or obviate the aforementioned problems.

SUMMARY OF THE INVENTION

The main objective of the present invention is to provide an adapting assembly of a ceiling fan, and the adapting assembly has at least one rotary shaft and a lower sealing ring. Each of the at least one rotary shaft has a seat, a guiding portion and a through recess. The seat is formed as a semi-circular plate and has multiple fastening holes separately formed through the seat and an inner surface defined on a side of the seat. The guiding portion is semi-spherical, is formed on a bottom surface of the seat and has a guiding surface. The guiding surface of the guiding portion is flush with the inner surface of the seat. The through recess is formed in the guiding surface of the guiding portion and has two opposite ends extending through the seat and the guiding portion respectively. The lower sealing ring has an annular frame and at least one protrusion. The annular frame has an inner annular surface. The at least one protrusion is formed on the inner annular surface of the annular frame. The guiding portion of the at least one rotary shaft is mounted through the lower sealing ring, and the guiding surface of the guiding portion of each of the at least one rotary shaft abuts against the at least one protrusion.

The main objective of the present invention is to provide a ceiling fan that includes a stationary base, a driving device, at least one rotary shaft as described, a lower cover, a lower sealing ring, and a blade assembly. The stationary base includes a hanging bracket and a synchronous electric machine. The hanging bracket has a lower end and an accommodating space defined in the lower end of the hanging bracket. The synchronous electric machine is mounted in the accommodating space of the hanging bracket. The driving device has two end portions and a driving rod. One of the end portions of the driving device is connected to the synchronous electric machine. The driving rod protrudes from the other one of the end portions of the driving device. Each of the rotary shaft has a seat, a guiding portion and a through recess. The seat is formed as a semi-circular plate and has multiple fastening holes separately formed 25 through the seat, and an inner surface defined on a side of the seat. The guiding portion is semi-spherical, is formed on a bottom surface of the seat and has a guiding surface. The guiding surface of the guiding portion is flush with the inner surface of the seat. The through recess is formed in the guiding surface of the guiding portion and has two opposite ends extending through the seat and the guiding portion respectively. Each of the at least one rotary shaft is securely connected to the driving device via multiple fasteners that are mounted through the fastening holes of the seat of said rotary shaft and are fastened to the driving device. The driving rod of the driving device is mounted through the through recess of the at least one rotary shaft. The lower cover is securely connected to the stationary base and has a mounting recess defined in the lower cover and a shaft hole formed through a lower end of the lower cover. The lower sealing ring is mounted in the mounting recess of the lower cover, is securely connected with the lower cover and has an annular frame and at least one protrusion. The at least one protrusion is formed on an inner annular surface of the annular frame. The guiding portion of the at least one rotary shaft is mounted through the lower sealing ring and protrudes in the shaft hole of the lower cover. The guiding surface of the guiding portion of each of the at least one rotary shaft abuts against the at least one protrusion. The blade assembly is securely connected to the driving rod of the driving device.

In the adapting assembly, the seat of the rotary shaft is semi-circular and the guiding portion is semi-spherical. Thus, when the rotary shaft is rotated, the guiding surface of the at least one rotary shaft and the at least one protrusion of the lower sealing ring coordinate with each other to rotate. The adapting assembly has reduced volume. Accordingly, the ceiling fan having the adapting assembly is lightweight, has reduced power consumption and manufacturing cost, and is easy for installation.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
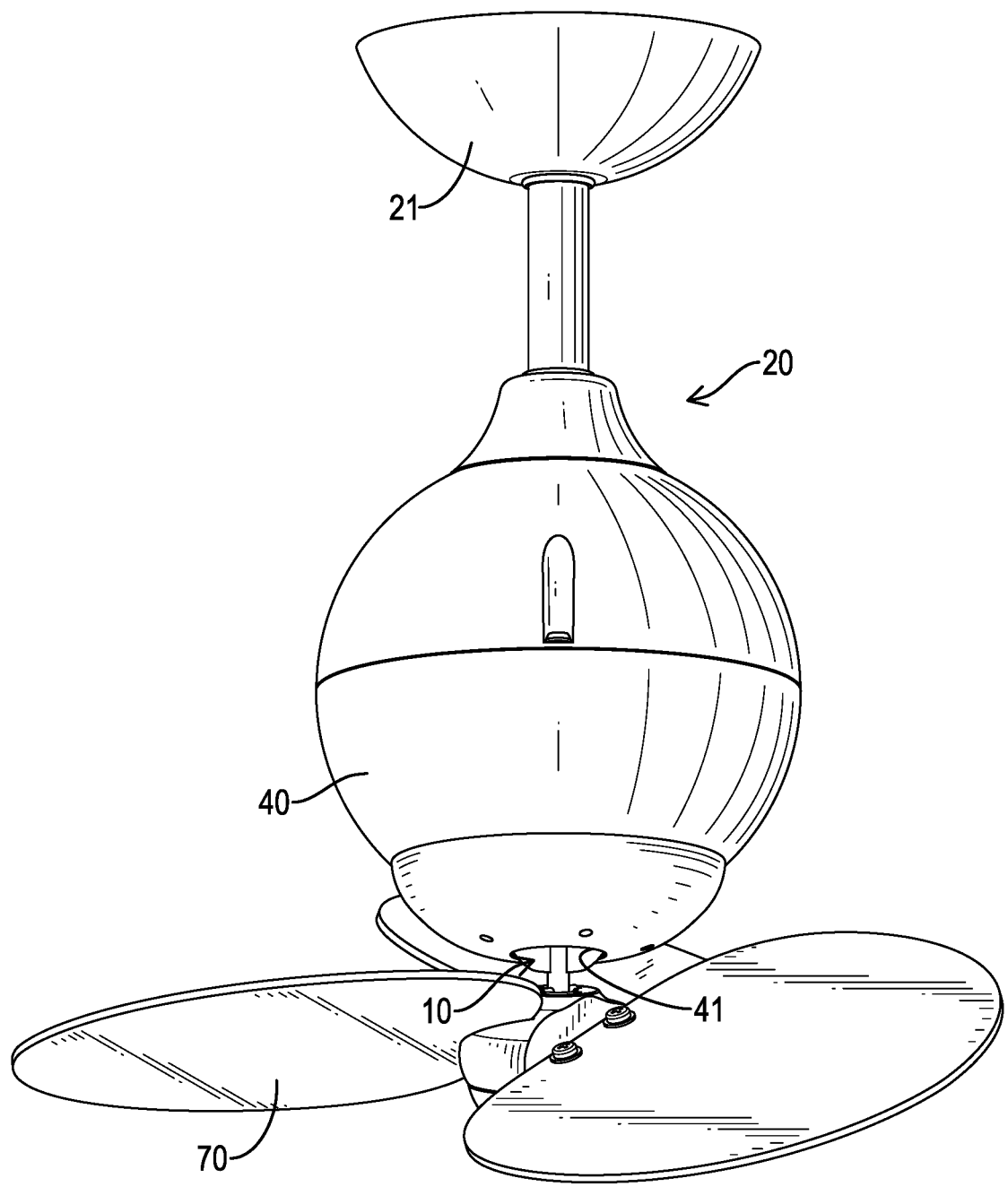
FIG. 1 is a perspective view of a ceiling fan in accordance with the present invention.
Figure 2:
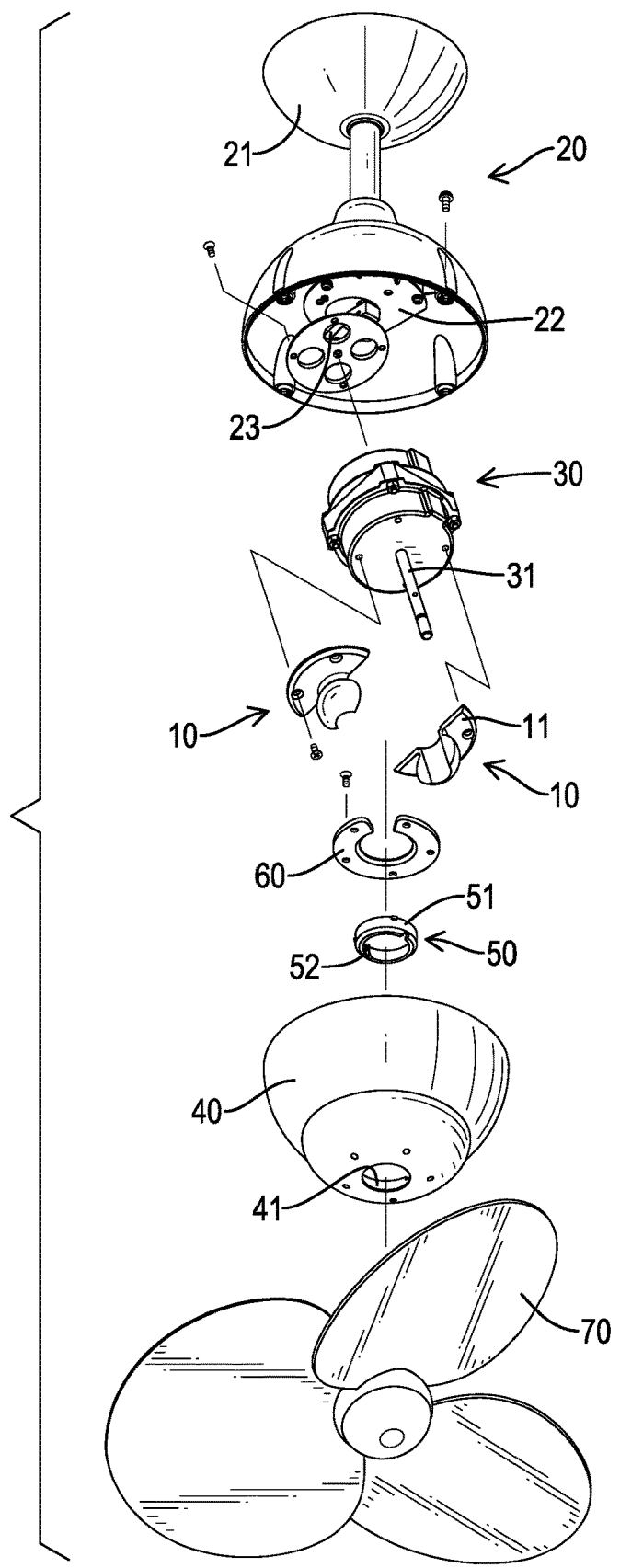
FIG. 2 is an exploded perspective view of the ceiling fan in FIG. 1.

With reference to FIGS. 1 and 2, a ceiling fan in accordance with the present invention comprises at least one rotary shaft 10, a stationary base 20, a driving device 30, a lower cover 40, a lower sealing ring 50, a retaining ring 60, and a blade assembly 70. The at least one rotary shaft 10 and the lower sealing ring 50 forms an adapting assembly.

With further reference to FIGS. 2 to 5, each of the rotary shaft 10 has a seat 11, a guiding portion 12 and a through recess 122. The guiding portion 12 and the seat 11 are integrally formed as a single part through a stamping process. The seat 11 is formed as a semi-circular plate and has multiple fastening holes 111, an inner surface 112, and an indentation 113. The fastening holes 111 are separately formed through the seat 11. The inner surface 112 is defined on a side of the seat 11. Specifically, the inner surface 112 extends along a diametric direction of the seat 11 which is semi-circular. The indentation 113 is formed in the inner surface 112 of the seat 11 and. In the preferred embodiment, the indentation 113 is arc-shaped. However, a shape of the indentation 113 is not limited thereto, and may be modified according to users' needs. The indentation 113 further reduces a volume and a weight of the rotary shaft 10.

The guiding portion 12 is semi-spherical, is formed on a bottom surface of the seat 11 and is disposed adjacent to the inner surface 112. The guiding portion 12 has a guiding surface 121. The guiding surface 121 of the guiding portion 12 is flush with the inner surface 112 of the seat 11. The through recess 122 is formed in the guiding surface 121 of the guiding portion 12 and has two opposite ends extending through the seat 11 and the guiding portion 12 respectively. The through recess 122 is connected with the indentation 113 of the seat 11. In the preferred embodiment, the through recess 122 is semi-circular in cross-section. However, a shape of the through recess 122 is not limited thereto, and may be modified according to the users' needs.

Figure 3:
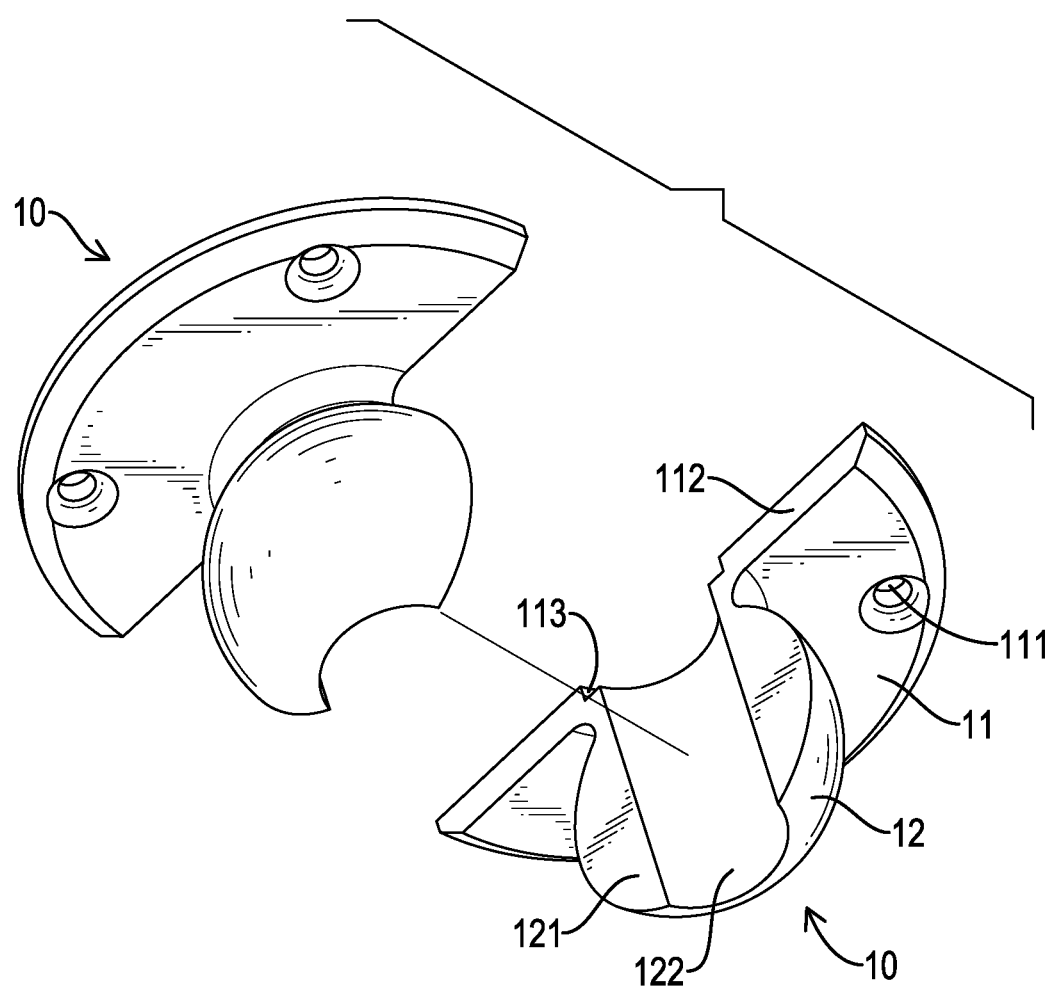
FIG. 3 is an exploded perspective view of a rotary shaft of the ceiling fan in FIG. 1.
Figure 4:
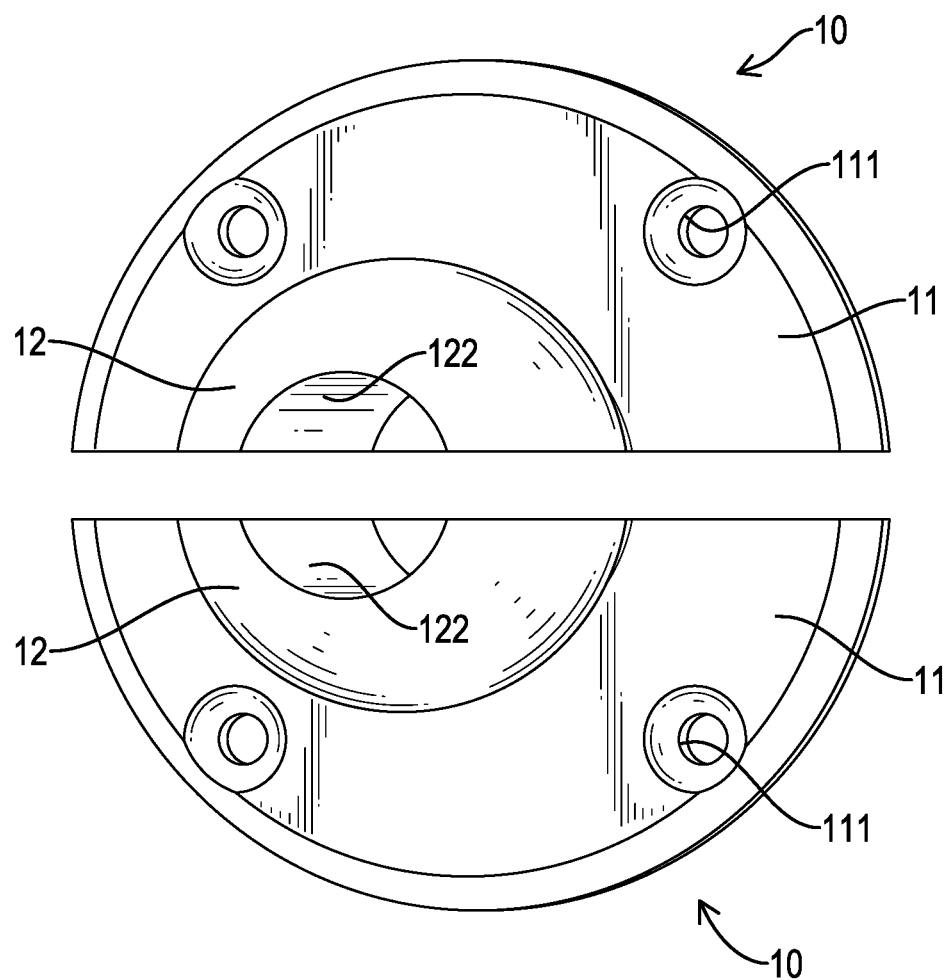
FIG. 4 is a bottom view of the rotary shaft of the ceiling fan in FIG. 4.

With reference to FIGS. 1 to 3, the stationary base 20 includes a hanging bracket 21, a synchronous electric machine 22, and a linking rod 23. The hanging bracket 21 has a lower end, an upper end and an accommodating space. The accommodating space is defined in the lower end of the hanging bracket 21. The synchronous electric machine 22 is mounted in the accommodating space of the hanging bracket 21. The linking rod 23 has two ends. One of the ends of the linking rod 23 is connected to the synchronous electric machine 22. In the preferred embodiment, the synchronous electric machine 22 is, but is not limited to be, a motor. The upper end of the hanging bracket 21 is configured to be securely connected to a ceiling.

The driving device 30 has two end portions and a driving rod 31. One of the end portions of the driving device 30 is connected to the synchronous electric machine 22, and more specifically, is connected to the other one of the ends of the linking rod 23. The droving rod 31 protrudes from the other one of the end portions of the driving device 30. In the preferred embodiment, the driving device 30 is, but is not limited to be, a motor. The driving device 30 may be inclined and is rotatable around the end, which is connected to the synchronous electric machine 22, of the linking rod 23. Each of the at least one rotary shaft 10 is securely connected to the driving device 30 via multiple fasteners that are mounted through the fastening holes 111 of the seat 11 of said rotary shaft 10 and are fastened to the driving device 30. The driving rod 31 of the driving device 30 is mounted through the through recess 122 of the at least one rotary shaft 10. In the preferred embodiment, the at least one rotary shaft 10 includes two rotary shafts 10. The guiding surface 121 of the guiding portion 12 of each one of the rotary shafts 10 faces toward and is spaced from the guiding surface 121 of the guiding portion 12 of the other one of the rotary shafts 10. However, a number of the rotary shafts 10 is not limited to two, and the at least one rotary shaft 10 may include only one rotary shaft 10.

The lower cover 40 is securely connected to the stationary base 20 and has a lower end, a mounting recess and a shaft hole 41. The mounting recess is defined in the lower cover 40 for accommodating the driving device 30 and the at least one rotary shaft 10. The shaft hole 41 is formed through the lower end of the lower cover 40.

The lower sealing ring 50 is mounted in the mounting recess of the lower cover 40 and is securely connected with the lower cover 40. The lower sealing ring 50 has an annular frame 51 and at least one protrusion 52. The annular frame 51 has an inner annular surface. The at least one protrusion 52 is formed on the inner annular surface of the annular frame 51. The guiding portion 12 of the at least one rotary shaft 10 is mounted through the lower sealing ring 50 and protrudes in the shaft hole 41 of the lower cover 40. The guiding surface 121 of the guiding portion 12 of each of the at least one rotary shaft 10 abuts against the at least one protrusion 52. In the preferred embodiment, the at least one protrusion 52 includes two protrusions 52 oppositely disposed on the inner annular surface of the annular frame 51. However, a number of the at least one protrusion 52 is not limited thereto and the at least one protrusion 52 may include only one protrusion 52. Furthermore, when the at least one rotary shaft 10 includes two rotary shafts 10 as described, each of the two protrusions 52 of the lower sealing ring 50 is disposed between the guiding surfaces 121 of the guiding portions 12 of the two rotary shafts 10.

The retaining ring 60 is C-shaped, covers the lower sealing ring 50, and is securely connected to the lower cover 40.

The blade assembly 70 is securely connected to the driving shaft 31 of the driving device 30. The blade assembly 70 is a conventional blade assembly of a conventional ceiling fan, and therefore a further detailed structure of the blade assembly 70 is omitted.

Figure 5:
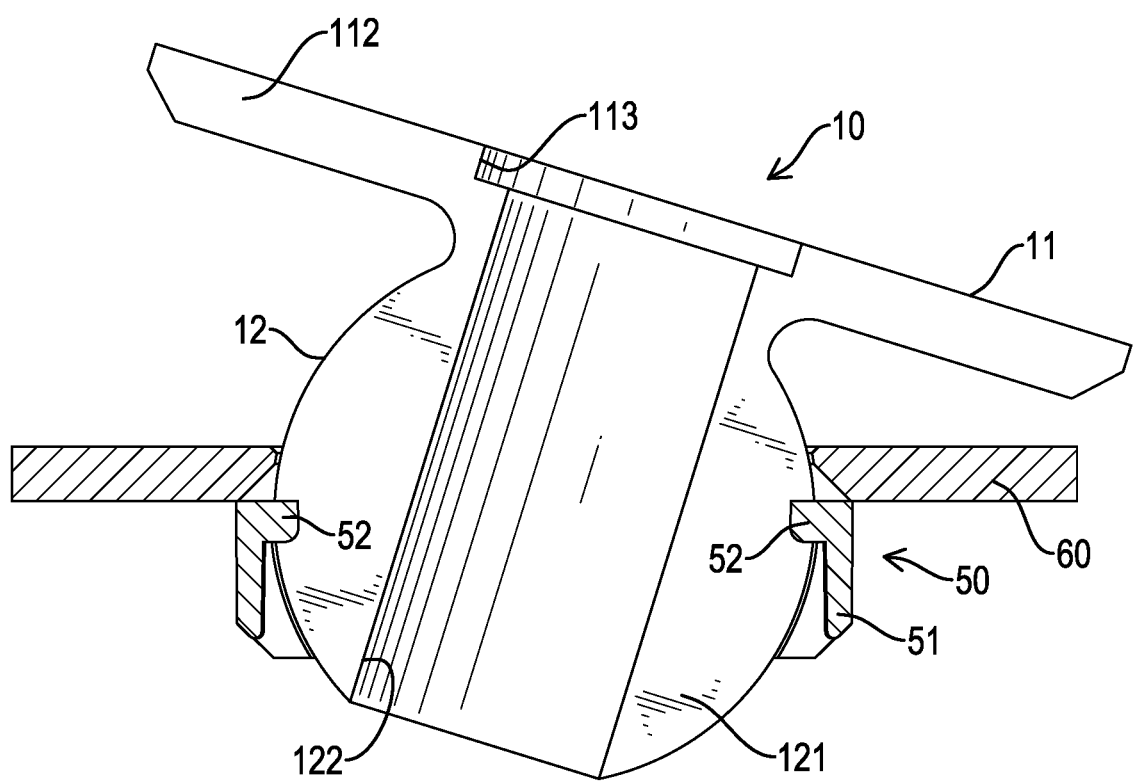
FIG. 5 is an operational cross-sectional side view of the rotary shaft and the lower sealing ring in FIG. 4.
Figure 6:
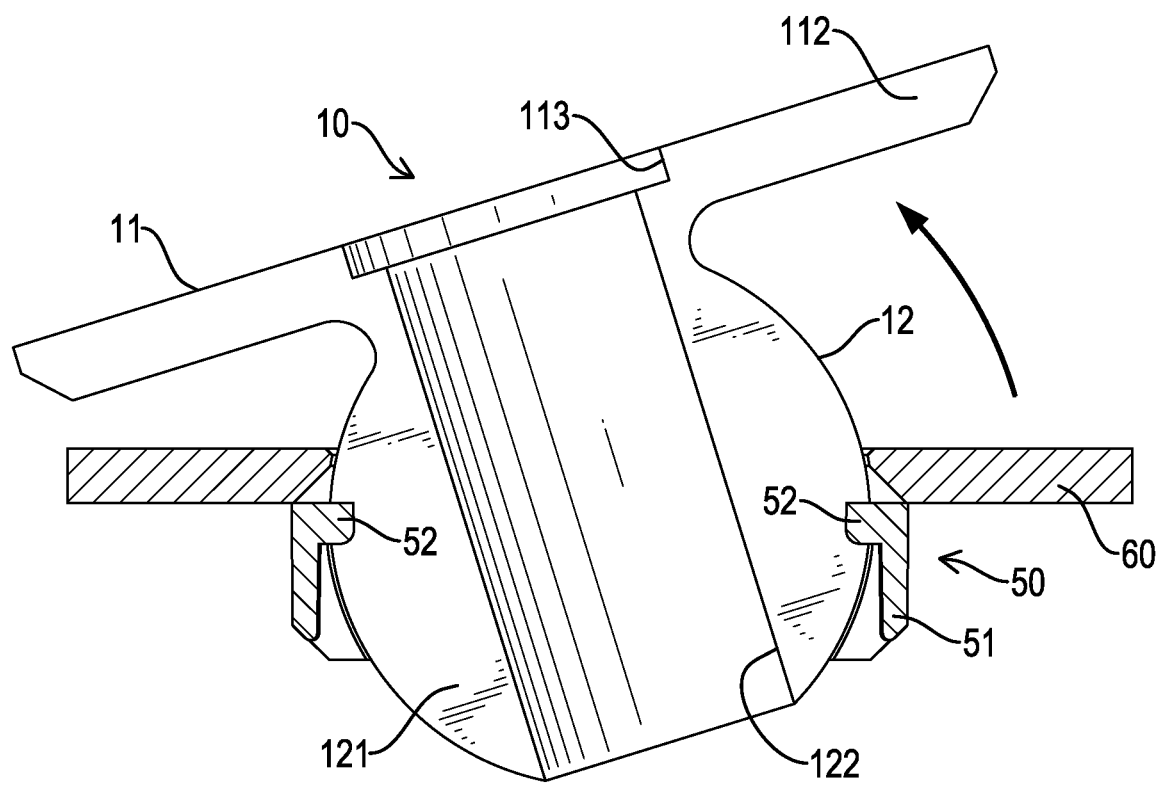
FIG. 6 is another operational cross-sectional side view of the rotary shaft and the lower sealing ring in FIG. 4.
Figure 7:
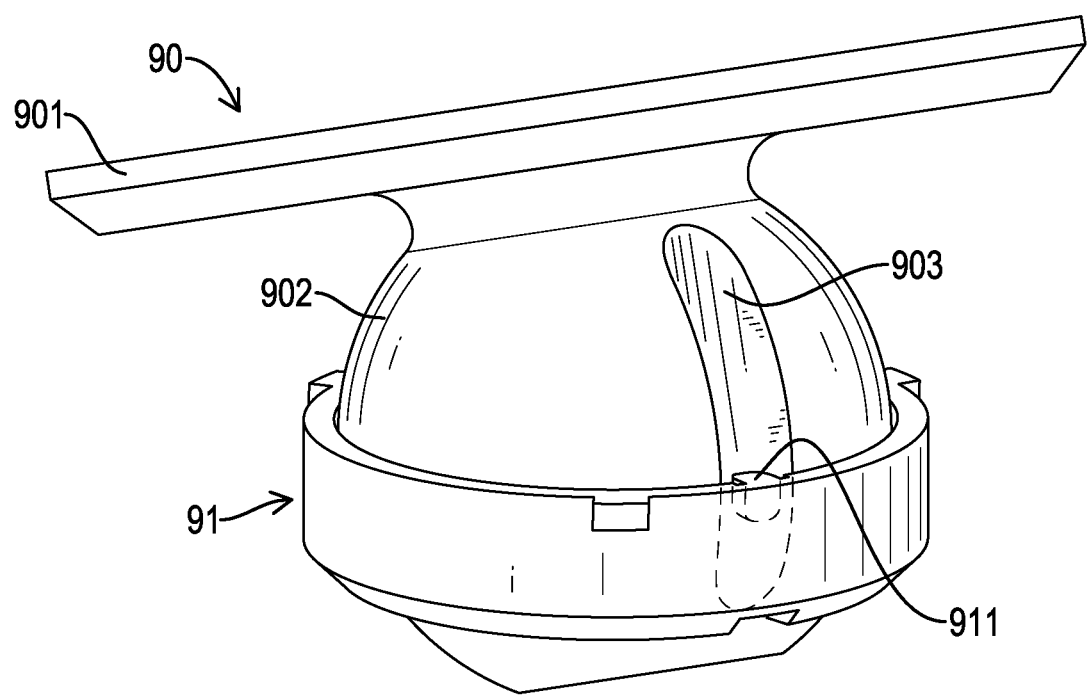
FIG. 7 is a perspective view of a rotary shaft and a sealing ring of a conventional ceiling fan in accordance with the prior art.

With reference to FIGS. 2, 5 and 6, the ceiling fan is securely mounted on the ceiling with the hanging bracket 21. When the ceiling fan is started, the synchronous electric machine 22 drives the linking rod 23 to rotate to make the driving device 30 to rotate around the end, which is connected to the synchronous electric machine 22, of the linking rod 23. During rotation of the driving device 30, the at least one rotary shaft 10 are synchronously rotated with the guiding surface 121 abutting against the at least one protrusion 52 of the lower sealing ring 50, such that the blade assembly 70 and the driving device 30 are rotated stably.

In the rotary shaft 10, the seat 11 of the rotary shaft 10 is semi-circular and the guiding portion 12 is semi-spherical. Thus, when the rotary shaft 10 is rotated, the guiding surface 121 of the at least one rotary shaft 10 and the at least one protrusion 52 of the lower sealing ring 50 coordinate with each other to rotate. The adapting assembly having the rotary shaft 10 and the lower sealing ring 50 as described has reduced volume. Accordingly, the ceiling fan having the rotary shaft 10 is lightweight, has reduced power consumption and manufacturing cost, and is easy for installation.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An adapting assembly of a ceiling fan, and the adapting assembly having:
   at least one rotary shaft, and each of the at least one rotary shaft having
      a seat formed as a semi-circular plate and having multiple fastening holes separately formed through the seat; and
      an inner surface defined on a side of the seat;
   a guiding portion being semi-spherical, formed on a bottom surface of the seat and having a guiding surface, and the guiding surface of the guiding portion being flush with the inner surface of the seat; and
   a through recess formed in the guiding surface of the guiding portion and having two opposite ends extending through the seat and the guiding portion respectively; and
   a lower sealing ring having
      an annular frame having an inner annular surface; and
      at least one protrusion formed on the inner annular surface of the annular frame, wherein the guiding portion of the at least one rotary shaft is mounted through the lower sealing ring, and the guiding surface of the guiding portion of each of the at least one rotary shaft abuts against a respective one of the at least one protrusion.

2. The adapting assembly of the ceiling fan as claimed in claim 1, wherein the seat of each of the at least one rotary shaft further has an indentation formed in the inner surface of the seat and connected with the through recess of the guiding portion.

3. A ceiling fan comprising:
   a stationary base including
      a hanging bracket having a lower end and an accommodating space, and the accommodating space defined in the lower end of the hanging bracket; and
      a synchronous electric machine mounted in the accommodating space of the hanging bracket;
   a driving device having
      two end portions, and one of the end portions of the driving device connected to the synchronous electric machine; and
      a driving rod protruding from the other one of the end portions of the driving device;
   at least one rotary shaft, and each of the at least one rotary shaft having
      a seat formed as a semi-circular plate and having multiple fastening holes separately formed through the seat; and
      an inner surface defined on a side of the seat;
   a guiding portion being semi-spherical, formed on a bottom surface of the seat and having a guiding surface, and the guiding surface of the guiding portion being flush with the inner surface of the seat; and
   a through recess formed in the guiding surface of the guiding portion and having two opposite ends extending through the seat and the guiding portion respectively; wherein each of the at least one rotary shaft is securely connected to the driving device via multiple fasteners that are mounted through the fastening holes of the seat of the at least one rotary shaft and are fastened to the driving device, wherein the driving rod of the driving device is mounted through the through recess of the at least one rotary shaft;
   a lower cover securely connected to the stationary base and having
      a mounting recess defined in the lower cover; and
      a shaft hole formed through a lower end of the lower cover;
   a lower sealing ring mounted in the mounting recess of the lower cover, securely connected with the lower cover and having
      an annular frame having an inner annular surface; and
      at least one protrusion formed on the inner annular surface of the annular frame, wherein the guiding portion of the at least one rotary shaft is mounted through the lower sealing ring and protrudes in the shaft hole of the lower cover, and the guiding surface of the guiding portion of each of the at least one rotary shaft abuts against the at least one protrusion; and
   a blade assembly securely connected to the driving rod of the driving device.

4. The ceiling fan as claimed in claim 3, wherein
   the at least one rotary shaft includes two rotary shafts, and the guiding surface of the guiding portion of each one of the rotary shafts faces toward and is spaced from the guiding surface of the guiding portion of the other one of the rotary shafts; and
   the at least one protrusion includes two protrusions oppositely disposed on the inner annular surface of the annular frame, and each of the two protrusions of the lower sealing ring is disposed between the guiding surfaces of the guiding portions of the two rotary shafts.

5. The ceiling fan as claimed in claim 3 further comprising a retaining ring being C-shaped, covering the lower sealing ring, and securely connected to the lower cover.

6. The ceiling fan as claimed in claim 4 further comprising a retaining ring being C-shaped, covering the lower sealing ring, and securely connected to the lower cover.

7. The ceiling fan as claimed in claim 3, wherein the seat of each of the at least one rotary shaft further has an indentation formed in the inner surface of the seat and connected with the through recess of the guiding portion.

8. The ceiling fan as claimed in claim 4, wherein the seat of each of the at least one rotary shaft further has an indentation formed in the inner surface of the seat and connected with the through recess of the guiding portion.

* * * * *